April 2, 1957  P. F. FOGGIANO ET AL  2,787,472
DEVICE FOR MOVING BABY CARRIAGES OVER CURB AND STEPS
Filed May 25, 1955  4 Sheets-Sheet 1

INVENTORS
PELLEGRINO FRED FOGGIANO
ALBERINO ALBERELLI
HOWARD MATTEL
BY
ATTORNEY

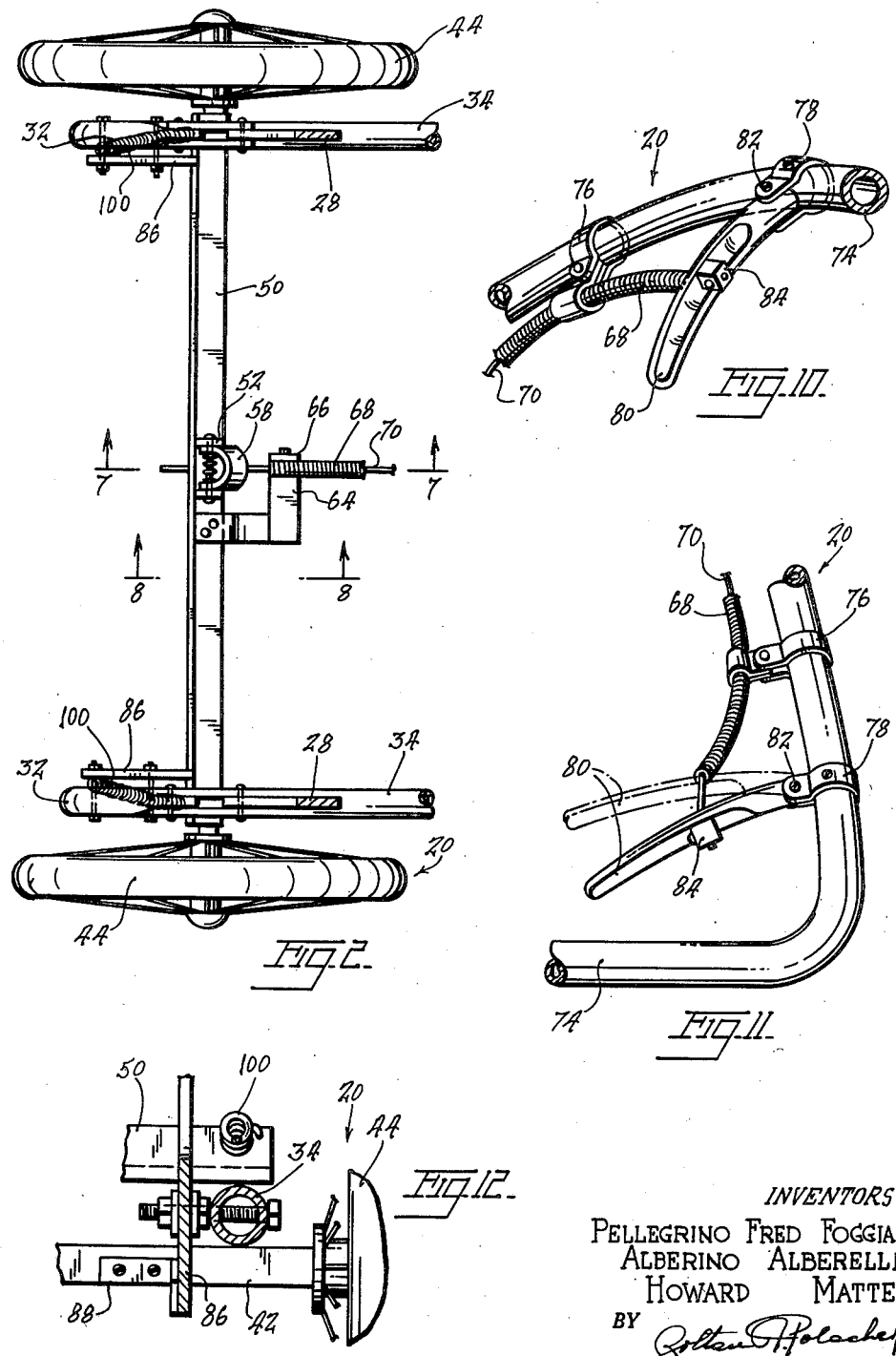

INVENTORS
PELLEGRINO FRED FOGGIANO
ALBERINO ALBERELLI
HOWARD MATTEL
BY
ATTORNEY

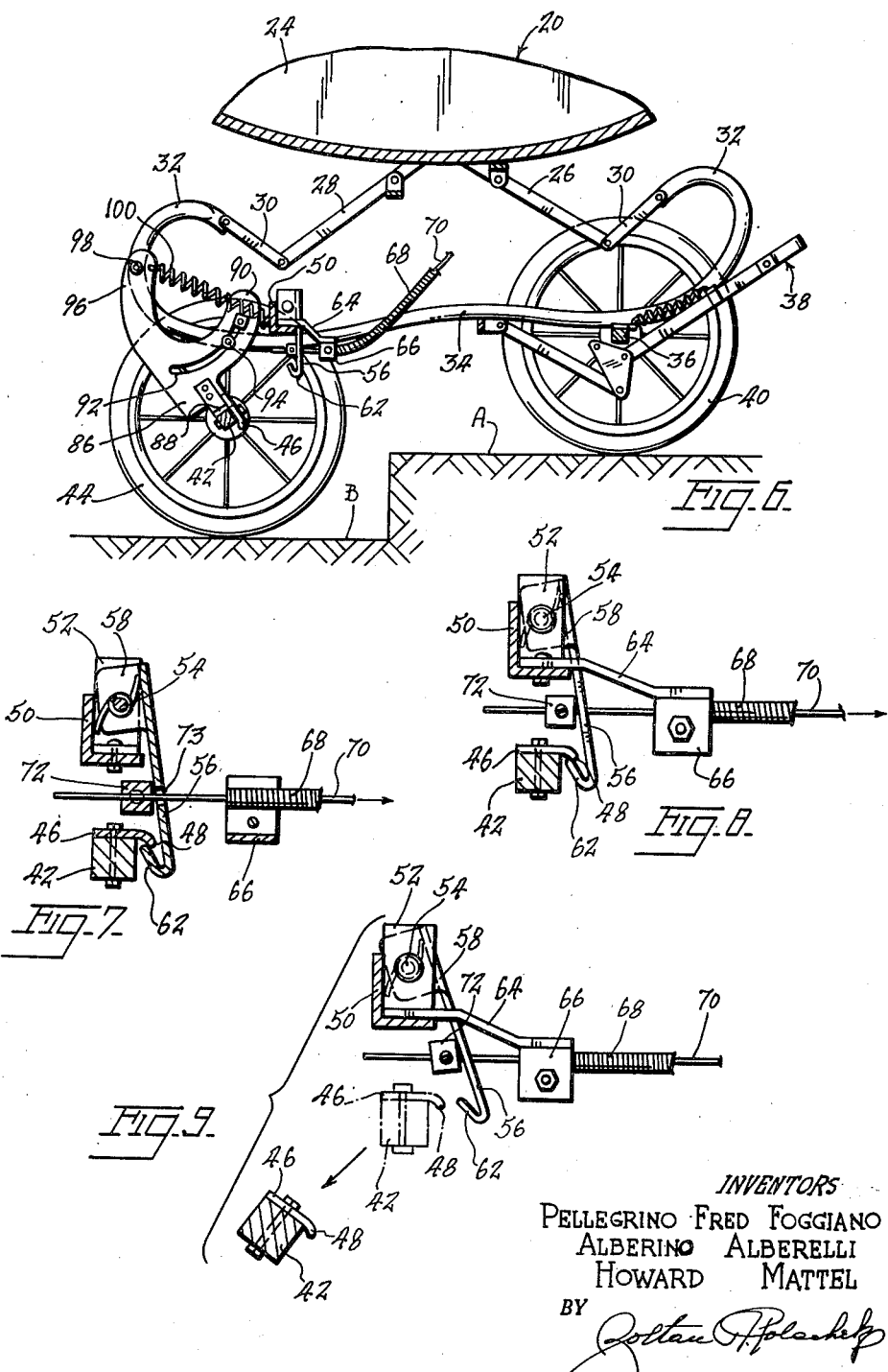

United States Patent Office 2,787,472
Patented Apr. 2, 1957

2,787,472

DEVICE FOR MOVING BABY CARRIAGES OVER CURB AND STEPS

Pellegrino Fred Foggiano and Alberino Alberelli, Mount Vernon, and Howard Mattel, Bronx, N. Y.

Application May 25, 1955, Serial No. 510,984

3 Claims. (Cl. 280—5.28)

This invention relates to baby carriages, and more particularly has reference to a vehicle of this type of such a design as to facilitate the movement of the same down a curb or step.

Considerable difficulty is experienced in taking a baby carriage down a curb or step. Further, the same problem is encountered when moving a baby carriage off a curb, since the baby carriage must be generally, tilted backwards to balance the same sufficiently for the drop to the lower level. Even under these circumstances, the movement of the baby carriage to the lower level is not only a matter of inconvenience for the person wheeling the carraige, but also tends to disturb the infant.

While it is not broadly new to provide baby carriages designed to facilitate the movement thereof down one or more steps, it is the main object of the present invention to provide a generally improved device of this type, which will be characterized by its ease of adjustment to a position in which it can be moved down the step or curb.

A further object of importance is to provide a baby carriage as described which, after having been moved down the step or curb will tend to return to a position in which it is adapted for travel along a level surface.

Still another object is to adapt the carriage for movement down one or more steps through the medium of a relatively simple assembly disposed in a position on the carriage where it will escape detection by the casual viewer, will not interfere with normal operation of the carriage, and will be rugged and trouble free in operation.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 2 is an enlarged sectional view on line 2—2 of Fig. 1.

Fig. 6 is a fragmentary, longitudinal sectional view through the carriage, as it appears when moving down the curb.

Fig. 7 is an enlarged detail sectional view of the latch assembly on line 7—7 of Fig. 2, in latched position.

Fig. 8 is an enlarged detail sectional view on line 8—8 of Fig. 2 showing the latch assembly in latched position, in side elevation.

Fig. 9 is a view similar to Fig. 8 with the latch released, the dotted lines showing the position of the front axle immediately after disengagement from the latch and the full lines showing the front axle in the position assumed thereby when the carriage is to be moved down the curb.

Fig. 10 is a fragmentary perspective view on an enlarged scale of the means for remotely controlling operation of the latch.

Fig. 11 is a plan view of the remote control means of Fig. 10, the dotted and full lines showing the operating handle in its normal and latch releasing positions respectively.

Fig. 12 is an enlarged detail sectional view on line 12—12 of Fig. 1.

Figure 1:
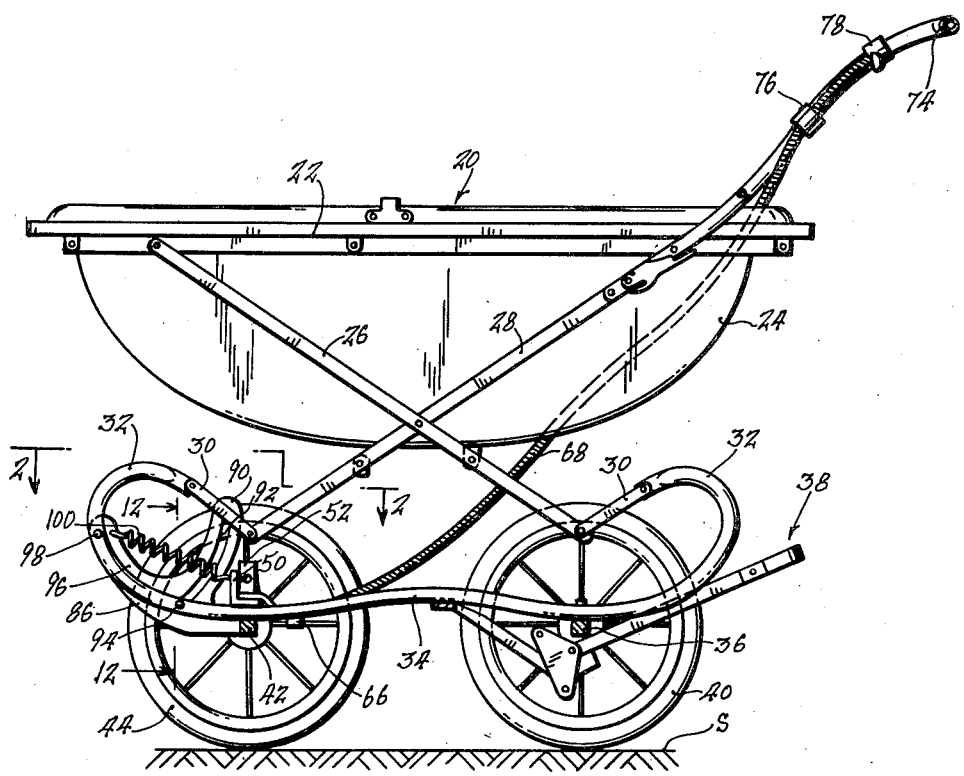
Fig. 1 is a side elevational view of a baby carriage formed according to the present invention.

A baby carriage generally designated at 20 includes a rectangular, open frame 22 lying in a horizontal plane, and extending about the upper portion of a flexible, infant-supporting body 24, in supporting relation to said body. Pivotally connected at their upper ends to the frame, at opposite sides of body 24, are crossed legs 26, 28, pivotally joined at their point of crossing, and attached pivotally at their lower ends to links 30 disposed at opposite sides of the carriage. Links 30 are pivotally connected at their other ends to the upwardly and inwardly turned end portions 32 of side rails 34 which as shown, immediately between their ends, may have slightly upwardly curved portions. Connected between the side rails 34, adjacent the rear end portions thereof, is a rear axle 36, on which is mounted a brake assembly generally designated 38, and rotatable upon the opposite ends of the rear axle are rear wheels 40.

The construction so far described is conventional per se. The carriage, as will be readily apparent, is collapsible in the direction of the wheels, due to the pivotal connections of the legs to one another and to the frame. However, it is not essential to the present invention that the carriage be of the collapsible type and the illustrated construction is to be understood as being offered merely by way of example of one type of baby carriage to which the invention can be applied.

Figure 3:
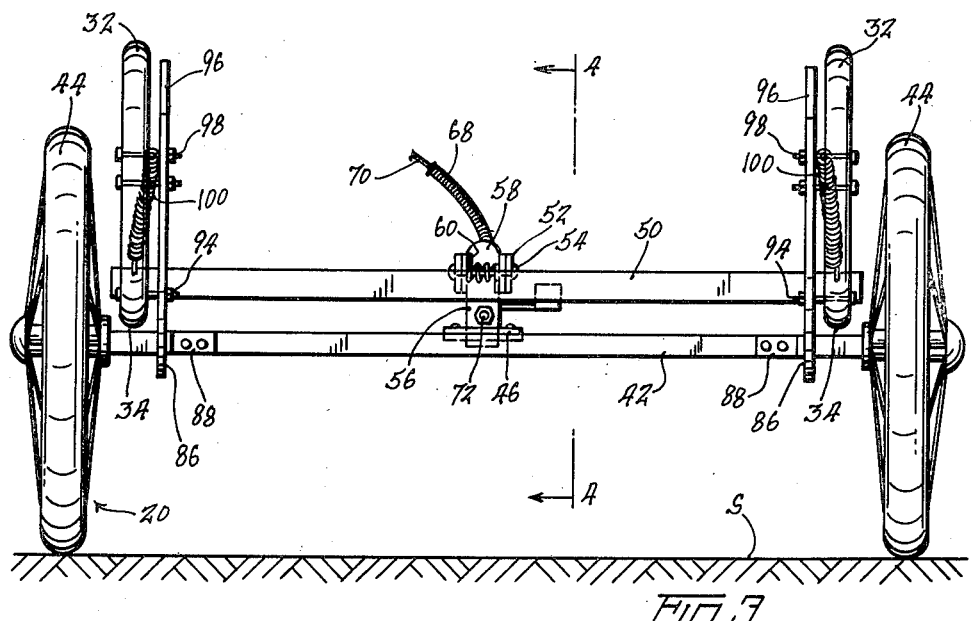
Fig. 3 is a front elevational view of the lower portion of the carriage, on an enlarged scale.

A front axle 42 of rectangular cross section underlies the forward parts of side rails 34 at its opposite ends (Fig. 3) and mounted on the extremities of the front axle are front wheels 44. The front axle, as distinguished from the rear axle, is not connected to the side rails 34, since the front axle, in accordance with the invention, is to move toward and away from the side rails as will be readily seen by comparison of Figs. 4 and 5.

Secured by screws or equivalent fasteners to the top surface of front axle 42, medially between side rails 34, is a plate 46 which, as shown in Figs. 7 and 9, has a rearwardly and downwardly curved lip 48 projecting laterally of axle 42.

Extending above and in parallelism with front axle 42 is an elongated crossbar 50 formed from angle iron or similar material, bolted or otherwise fixedly attached at its opposite ends to rails 34. Fixedly mounted on crossbar 50, medially between the opposite ends thereof, is a U-shaped, upwardly projecting bracket 52 between the arms of which extends a hinge pin 54 on which is swingable a latch 56 formed at its upper end with forwardly projecting ears 58 through which the pivot pin extends. A spring 60 is coiled about pivot pin 54 between ears 58, and has one end bearing against the upper end of latch 56 and the other end bearing against crossbar 50. The spring is under tension tending to swing the latch in a clockwise direction in Figs. 7 and 9 about the axis of pin 54, for engagement of a hook 62, formed upon the lower end of the latch, under the lip 48.

Also fixedly secured to crossbar 50 (see Figs. 2 and 9) is an L-shaped bracket 64, having a downwardly offset free end portion on which is mounted a depending clamping sleeve 66 in which is fixedly engaged one end of an elongated, flexible sheath 68 for a flexible steel control cable 70. A collar 72 is secured by a set screw to the cable, and can be adjusted longitudinally of the cable to correspondingly adjust the tension upon the cable. The cable passes through an opening 73 formed in latch 56, with the collar abutting against the front surface of the latch.

The sheath 68, as shown in Figs. 10 and 11, is extended below the carriage and at its other end terminates at one side of a handle 74 integrally formed upon the ends of legs 28. A clamping sleeve 76 is attached to said side of the baby carriage handle 74, and the sheath 68 is grippingly engaged by said sleeve. A second clamp 78 is secured to the handle 74 above clamp 76, and an elongated latch release handle 80 is pivotally connected to clamp 78 by means of a bolt 82.

The sheath 68 terminates adjacent handle 80, and cable 70 as shown in Fig. 11 projects out of the sheath extremity, through an opening in the latch release handle 80. A set collar 84 is adjustably secured to cable 70, bearing against the handle 80 to hold the cable assembled with the handle. The collars 72, 84 can be adjusted individually of one another, to place the desired amount of tension upon the cable 70, with the correct tension being readily established by experimentation, to suit the needs of the particular owner.

It will thus be seen that by pulling on the latch release handle 80 to shift it from its normal dotted line position of Fig. 11 to the full line position of Fig. 11, a corresponding pull will be exerted on cable 70, tending to shift the cable to the right in Fig. 7. As a result, the latch 56 is swung counterclockwise about pivot 54 against the restraint of spring 60, to become disengaged from lip 48. The axle 42 is thus disengaged from crossbar 50, and hence from the side rails or baby carriage frame to which the crossbar 50 is connected.

A pair of flat plates 86, disposed in vertical planes adjacent the forward end portions of the side rails (Figs. 1 and 3), are fixedly attached at their lower ends by L-shaped brackets 88 to the respective end portions of the front axle 42. The plates 86 each have an elongated, upwardly and rearwardly curving arm 90 having an arcuate, closed slot 92 formed therein through which slot extends a pin 94 passing through the forward end portion of the adjacent rail 34. Each plate is further formed with an upwardly and forwardly projecting arm 96, curved in substantial correspondence, in the normal position of the several parts shown in Figs. 1 and 4, with the forward part of the adjacent side rail 34. A pivot bolt 98 passes through the upper end of the arm 96 and through the forward end portion 32 of the associated side rail.

A spring 100 is connected between the upper end of each arm 96 and crossbar 50, under tension tending to contract the same.

Figure 4:
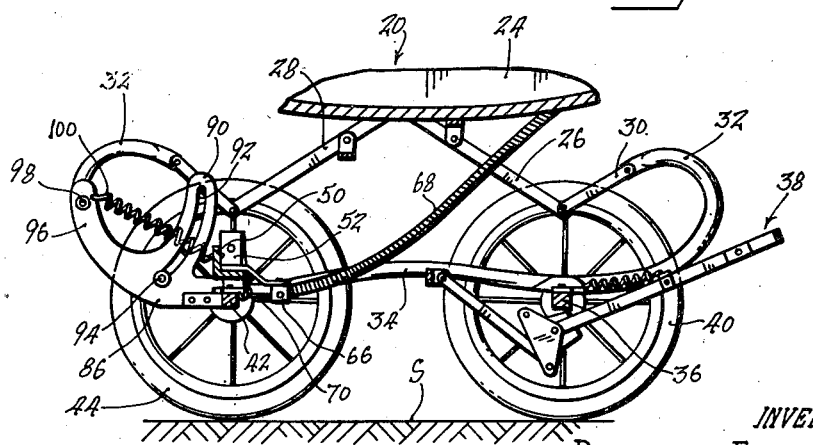
Fig. 4 is a vertical section on line 4—4 of Fig. 3.

In use, and assuming that the baby carriage is being moved over a level supporting surface S, the latch would be engaged with the front axle 42, and the several parts would be in the relationship shown in Figs. 1 and 4.

It will be seen that in this position of the parts, the body 24 is maintained level, and the front and rear axles are on the same horizontal level, that is, they are the same distance from the body support frame 22 of the carriage.

Assuming that the carriage is to be moved down the curb A, onto the roadway B (Fig. 6), the person operating the carriage disengages the latch in the manner previously described, and as a result, springs 100 are now free to contact, since the plates 86 are not fixed against movement relative to the side rails 34 following disengagement of the latch from the front axle 42 to which the plates 86 are affixed. The springs, tending to contract, pull rearwardly upon the forward arms 96 of the plates 86, causing the plates to rock about the axis defined by the pins 98. The front axle 42, it should be noted, is free to turn relative to the front wheels 44.

Figure 5:
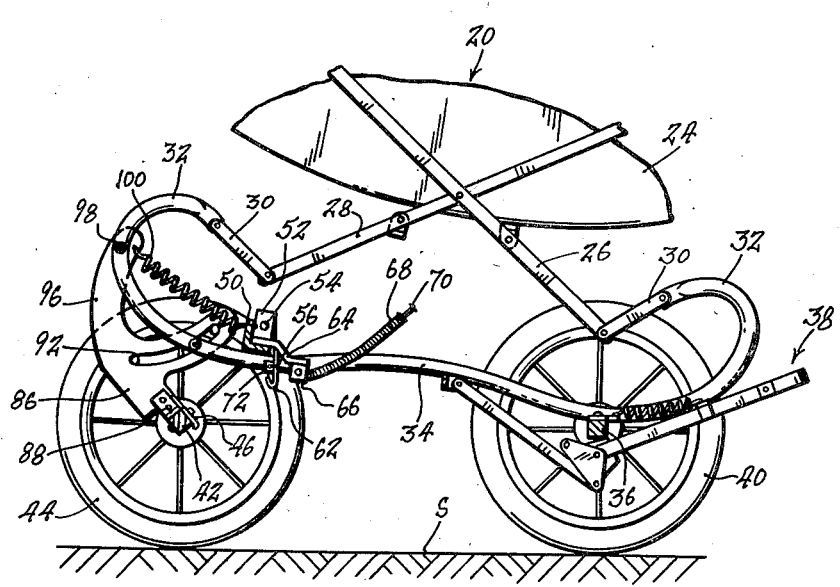
Fig. 5 is a fragmentary side elevational view showing the carriage as it appears when readied for descent of a step or curb.

As the plates 86 rock in a clockwise direction about the front axle, the pins 94 travel along the slots 92 to the positions shown in Fig. 5, and the result is that the front end portions of the side rails 34 are raised to a slight extent. The riser supplements the force of the spring by pressing down on the carriage handle slightly.

The carriage is now prepared for movement down the curb A onto the roadway B, and as it is moved down, the front wheels 44 will be at a lower level than the rear wheels 40, so as to engage a lower roadway B while the rear wheels are supported on an upper curb A. The body 24 of the baby carriage is thus maintained horizontal throughout the downward movement of the carriage.

When the carriage once again reaches a level surface S after descent from the curb, the weight of the front end portion of the carriage frame and of the body 24 overcomes the force of the springs, and causes the front axle 42 to swing upwardly against the restraint of springs 100. As it moves upwardly, it will cammingly engage, with its lip 48, the hook 62, temporarily biasing the hook 62 to the right in Fig. 7 against the restraint of spring 60 until it passes the hook and engages thereover. The hook 62 will now firmly engage under the lip 48, and the front axle is now once again engaged against movement away from the baby carriage frame.

It is to be understood that a suitable catch lock arrangement may be provided at the ends of the crossbar 50 which will hold the front wheels in lowered position so that the carriage may be rolled down several steps and thereafter a suitable means at the handle of the carriage will disconnect the catch lock so that the front wheels 44 may automatically assume their aligned horizontal position.

While we have illustrated and described the preferred embodiments of our invention, it is to be understood that we do not limit ourselves to the precise construction herein disclosed and that various changes and modifications may be made within the scope of the invention as defined in the appended claims.

Having thus described our invention, what we claim as new, and desire to secure by United States Letters Patent is:

1. In a baby carriage the combination, with a carriage frame including a carriage handle, a rear axle secured to the frame, and a pair of rear wheels on the rear axle, of a cross-bar affixed to the frame, a pair of plates pivotally connected to the frame, resilient, yielding means connected between the plates and crossbar under tension effective to bias the plates in one direction about their pivot axes, a front axle underlying the frame, front wheels carried by the front axle, latch means on the crossbar adapted to releasably connect the front axle to the crossbar, said front axle, when connected to the crossbar, preventing swinging of the plates in said direction, and remote control means extending to the carriage handle for releasing the latch to free the plates for swinging movement in said direction, the plates when swung in said direction shifting the front axle downwardly from the frame, said plates including upwardly projecting arms having closed guide slots curving in an arc about the pivot axes of the plates, and pins extending through said slots and frame, for maintaining the plates against deviation from their planes of swinging movement, the plates further including second arms projecting upwardly therefrom forwardly of the first-named arms, said springs being connected to the plates at the upper ends of the second-named arms, said frame including side rails to which the rear axle is connected, said rails comprising the portions of the frame to which the plates and crossbar are respectively connected.

2. In a baby carriage the combination, with a carriage frame including a carriage handle, a rear axle secured to the frame, and a pair of rear wheels on the rear axle, of a crossbar affixed to the frame, a pair of plates pivotally connected to the frame, resilient, yielding means connected between the plates and crossbar under tension effective to bias the plates in one direction about their pivot axes, a front axle underlying the frame, front wheels carried by the front axle, latch means on the crossbar adapted to releasably connect the front axle to the crossbar, said front axle, when connected to the crossbar, preventing swinging of the plates in said direction, and remote control means extending to the carriage handle for releasing the latch to free the plates for swinging movement in said direction, the plates when swung in said direction shifting the front axle downwardly from the frame, said plates including upwardly projecting arms having closed guide slots curving in an arc about the pivot axes of the plates, and pins extending through said slots and frame, for maintaining the plates against deviation from their planes of swinging movement, the plates further including second arms projecting upwardly therefrom forwardly of the first-named arms, said springs being connected to the plates at the upper ends of the second-named arms, said frame including side rails to which the rear axle is connected, said rails comprising the portions of the frame to which the plates and crossbar are respectively connected, said side rails having upwardly and rearwardly curved forward end portions, the second-named arms of the plates, in the latched position of the front axle, extending alongside said forward end portions of the rails and being curved substantially correspondingly to said forward end portions.

3. In a baby carriage the combination, with a carriage frame including a carriage handle, a rear axle secured to the frame, and a pair of rear wheels on the rear axle, of a crossbar affixed to the frame, a pair of plates pivotally connected to the frame, resilient, yielding means connected between the plates and crossbar under tension effective to bias the plates in one direction about their pivot axes, a front axle underlying the frame, front wheels carried by the front axle, latch means on the crossbar adapted to releasably connect the front axle to the crossbar, said front axle, when connected to the crossbar, preventing swinging of the plates in said direction, and remote control means extending to the carriage handle for releasing the latch to free the plates for swinging movement in said direction, the plates when swung in said direction shifting the front axle downwardly from the frame, said plates including upwardly projecting arms having closed guide slots curving in an arc about the pivot axes of the plates, and pins extending through said slots and frame, for maintaining the plates against deviation from their planes of swinging movement, the plates further including second arms projecting upwardly therefrom forwardly of the first-named arms, said springs being connected to the plates at the upper ends of the second-named arms, said frame including side rails to which the rear axle is connected, said rails comprising the portions of the frame to which the plates and crossbar are respectively connected, said side rails having upwardly and rearwardly curved forward end portions, the second-named arms of the plates, in the latched position of the front axle, extending alongside said forward end portions of the rails and being curved substantially correspondingly to said forward end portions, said springs extending over the guide pins and being connected to the second-named arms and crossbar respectively, forwardly and rearwardly of the guide pins.

References Cited in the file of this patent

UNITED STATES PATENTS

| | | |
|---|---|---|
| 572,658 | Marx | Dec. 8, 1896 |
| 819,302 | Munsing | May 1, 1906 |
| 857,696 | Weinstein | June 25, 1907 |
| 1,119,002 | Uherkocz | Dec. 1, 1914 |
| 2,418,665 | Rizzuto | Apr. 8, 1947 |

FOREIGN PATENTS

| | | |
|---|---|---|
| 56,647 | France | July 23, 1952 |
| | (Addition to No. 944,440) | |
| 933,928 | France | Jan. 7, 1948 |
| 643,407 | Great Britain | Sept. 20, 1950 |